(12) United States Patent
Chang et al.

(10) Patent No.: US 9,258,026 B2
(45) Date of Patent: Feb. 9, 2016

(54) MOBILE COMMUNICATION DEVICE WITH HUMAN BODY RECOGNITION FUNCTION

(71) Applicant: ASUSTek COMPUTER INC., Taipei (TW)

(72) Inventors: Yu-Chia Chang, Taipei (TW); Wen-Pin Li, Taipei (TW); Shih-Yan Chen, Taipei (TW); Tse-Chih Lin, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 107 days.

(21) Appl. No.: 14/254,243

(22) Filed: Apr. 16, 2014

(65) Prior Publication Data

US 2014/0323068 A1   Oct. 30, 2014

(30) Foreign Application Priority Data

Apr. 24, 2013   (CN) .......................... 2013 1 0145686

(51) Int. Cl.
*H01Q 11/12* (2006.01)
*H04B 1/04* (2006.01)
*H04B 1/3827* (2015.01)

(52) U.S. Cl.
CPC .................................... *H04B 1/3838* (2013.01)

(58) Field of Classification Search
USPC ............... 455/550.1, 117, 127.2; 340/539.22, 340/539.23, 537.1, 686.6; 327/517
See application file for complete search history.

(56) References Cited

U.S. PATENT DOCUMENTS

| | | | |
|---|---|---|---|
| 9,042,833 B1 * | 5/2015 | Jayaraj | H04B 1/38 455/101 |
| 2004/0214621 A1 | 10/2004 | Ponce De Leon et al. | |
| 2010/0107099 A1 * | 4/2010 | Frazier | G06F 3/044 715/765 |
| 2012/0071195 A1 | 3/2012 | Chakraborty et al. | |
| 2012/0214422 A1 * | 8/2012 | Shi | H04B 1/3838 455/67.11 |
| 2013/0169348 A1 * | 7/2013 | Shi | H04B 1/3838 327/517 |
| 2014/0015595 A1 * | 1/2014 | Van Ausdall | H03K 17/955 327/517 |

* cited by examiner

*Primary Examiner* — Nguyen Vo
(74) *Attorney, Agent, or Firm* — Muncy, Geissler, Olds & Lowe, P.C.

(57) ABSTRACT

A mobile communication device with a human body recognition function includes sensing pad and a sensor. The sensing pad is electrically connected to the sensor. When a target object approaches the mobile communication device, an induction signal is generated between the sensing pad and the target object. The sensor receives the induction signal, and the sensor includes a first sensitivity and a second sensitivity. When no target object approaches the mobile communication device, the sensor is set at the first sensitivity. When the sensor receives the induction signal, the first sensitivity is switched to the second sensitivity. The induction signal is converted into a first signal and the first sensitivity is compared with a default value. If the first signal is greater than the default value, the target object is determined as a human body and a power adjustment unit is adjusted to reduce an output power.

8 Claims, 4 Drawing Sheets

MOBILE COMMUNICATION DEVICE WITH HUMAN BODY RECOGNITION FUNCTION

CROSS-REFERENCE TO RELATED APPLICATION

This application claims the priority benefit of China application serial No. 201310145686.9, filed on Apr. 24, 2013. The entirety of the above-mentioned patent application is hereby incorporated by reference herein and made a part of specification.

BACKGROUND OF THE INVENTION

1. Field of the Invention

The invention relates to a mobile communication device and, more particularly, to a mobile communication device with a recognition function.

2. Description of the Related Art

In order to comply to the safety standards of specific absorption rate (SAR) formulated by the government, a proximity sensor and an antenna are set on a conventional mobile communication device to detect whether a non-human object or a human an body approaches the mobile communication device.

Please refer to FIG. 1, FIG. 1 is a schematic diagram showing a relationship between the operation of a conventional sensor and a power of a mobile communication device. When a target object approaches the mobile communication device, no matter a target object is a non-human object or a human body, an induction signal is generated between the target object and the sensing pad, and the sensor inside the mobile communication device receives the induction signal and transmits a control signal to a power transmitter of the mobile communication device to reduce an output power of the mobile communication device, so as to reduce the measurement of the specific absorption rate (SAR).

Conventionally, when the target object, includes a non-human object or a human body, approaches the mobile communication device, the power transmitter of the mobile communication device is adjusted to reduce the output power of the mobile communication device. In other words, although the conventional method ensures that the output power can be reduced when a human body approaches the mobile communication device for a lower SAR measurement comply to. However, when a non-human object approaches, the adjustment of the output power also reduces, thus alters the communication quality, and the power consumption becomes larger.

BRIEF SUMMARY OF THE INVENTION

A mobile communication device which complies to safety regulations with a human body recognition function is provided.

A mobile communication device with a human body recognition function includes a sensing pad and a sensor. The sensing pad is electrically connected to the sensor. When a target object approaches the mobile communication device, an induction signal (e.g. the capacitance difference value) is generated between the sensing pad and the target object. The sensor receives the induction signal, wherein the sensor includes a first sensitivity and a second sensitivity, and the first sensitivity is higher than the second sensitivity. When the sensor receives the induction signal, the sensor switches the first sensitivity to the second sensitivity. The induction signal is converted into a first signal, and the first signal is compared with a default value. If the first signal is greater than the default value, the target object is determined as a human body. The mobile communication device further includes a power adjustment unit which is electrically connected to the sensor. When the first signal is less than the default value, the target object is determined as a non-human object and an output power of the mobile communication device is not adjusted. The sensor includes a non-human detection mode and a human body detection mode. When the sensor is set at the first sensitivity, the sensor enters into the non-human detection mode. When the sensor is set at the second sensitivity, the sensor enters into the human body detection mode.

DETAILED DESCRIPTION OF THE EMBODIMENTS

A mobile communication device with a human body recognition function is illustrated with relating figures, and the same symbols denote the same structures, steps and components.

Figure 1:
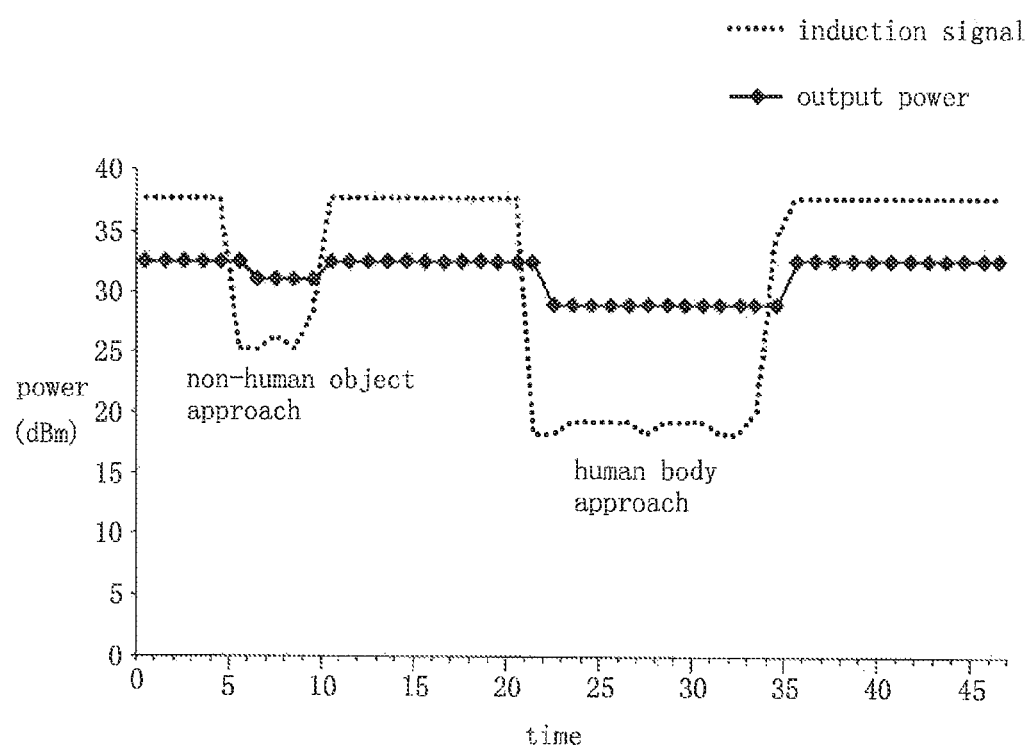
FIG. 1 is a schematic diagram showing a relationship between operation of a conventional sensor and a power of a mobile communication device in an embodiment of the invention.
Figure 2:
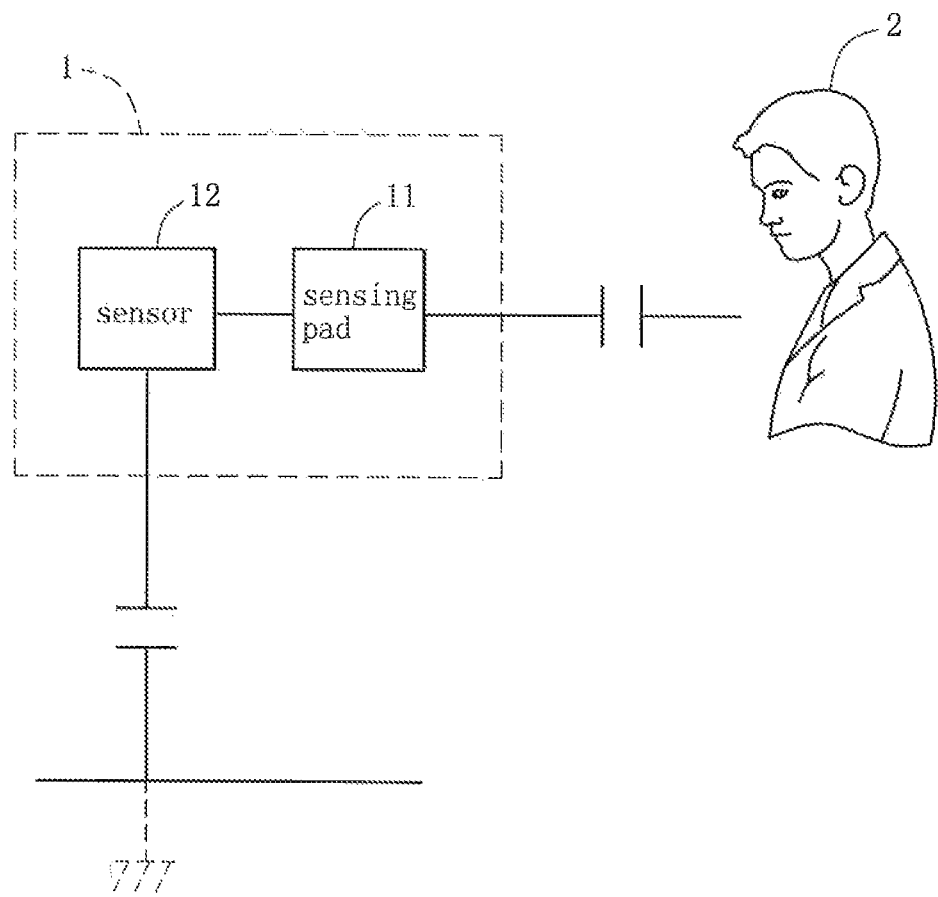
FIG. 2 is a schematic diagram showing an operation of a mobile communication device with a human body recognition function in an embodiment of the invention.
Figure 3:
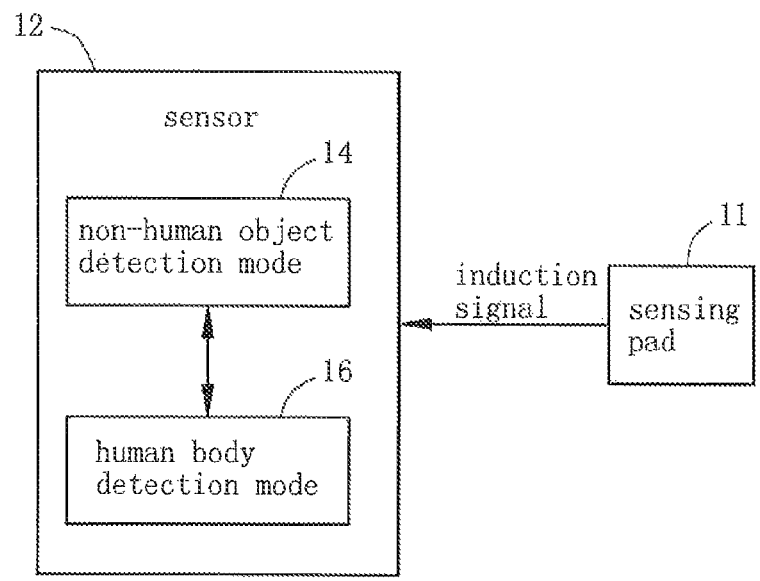
FIG. 3 is a schematic diagram showing a system of a mobile communication device with a human body recognition function in an embodiment of the invention.

Please refer to FIG. 2 and FIG. 3, FIG. 2 is a schematic diagram showing an operation of a mobile communication device with a human body recognition function and FIG. 3 is a schematic diagram showing a system of a mobile communication device with a human body recognition function.

A mobile communication device 1 with a human body recognition function is provided. The mobile communication device 1 may be a smart phone, a desktop computer, a tablet computer or a notebook, which is not limited herein. Please refer to FIG. 2, the mobile communication device 1 at least includes a sensing pad 11 and a sensor 12. The sensor 12 is electrically connected to the sensing pad 11.

The sensing pad 11 is used for inducting whether a target object approaches the mobile communication device 1. In the embodiment, the sensing pad 11 of the mobile communication device 1 operates in a normal mode. In the normal mode, an output power of the mobile communication device 1 keeps in a stable and high output power. The sensing pad 11 includes a good induction function, when a target object approaches the mobile communication device 1, an induction signal (the capacitance difference value) is generated between the sensing pad 11 and the target object. The sensor 12 receives the induction signal. In the embodiment, the sensor 12 may be a general touch panel sensor, and the sensor 12 receives the induction signal which is sent by the sensing pad 11.

The sensor 12 includes a first sensitivity and a second sensitivity, and the sensitivity of the first sensitivity is higher than that of the second sensitivity. In the embodiment, the sensor 12 is preset at the first sensitivity and the output power of the mobile communication device 1 keeps at a stable and high output power, and communication quality and induction capability of the sensing pad 11 is better. When the sensitivity is set higher, the sensing pad 11 has higher capability to induct that the target object approaches the mobile communication device 1.

The sensitivity also can be adjusted to the second sensitivity by the sensor 12, and then the output power of the mobile communication device 1 is lower, which results the communication quality and induction capability of the sensing pad 11 is poor. However, the mobile communication device 1 is still capable to recognize whether the target object approaches is a human body or anon-human object. In the embodiment, the mobile communication device 1 can easily recognize whether a target object approaches, but the mobile communication device 1 cannot recognize that the target object is a human body or a non-human a object. Thus, the sensitivity of the sensor 12 must be adjusted to the second sensitivity to use the lower sensitivity to recognize whether the target object is a human body or not. When the sensor 12 receives the induction signal, the first sensitivity is switched to the second sensitivity. The induction signal is converted into a first signal and the first sensitivity is compared with a default value. The "induction signal" herein represents that the signal generated by the sensing pad 11 to measure and determine whether a human body or a non-human object approaches. In other words, the induction signal represents that a capacitance difference value generated between the target object and the sensing pad 11 when the target object 2 approaches the sensing pad 11. Thus, no matter a human body or a non-human object approaches, an induction signal is generated and transmitted to the sensor 12.

Please refer to FIG. 3, the mobile communication device 1 includes a non-human object detection mode 14 and a human body detection mode 16. When the sensor 12 is set at the first sensitivity (higher sensitivity), it represents that the sensor 12 enters into the non-human object detection mode 14 to determine whether any target object approaches the mobile communication device 1. Otherwise, when the sensor is set at the second sensitivity, it represents that the sensor 12 enters into the human body detection mode 16 to determine whether the approaching target object is a human body or not.

Figure 4:
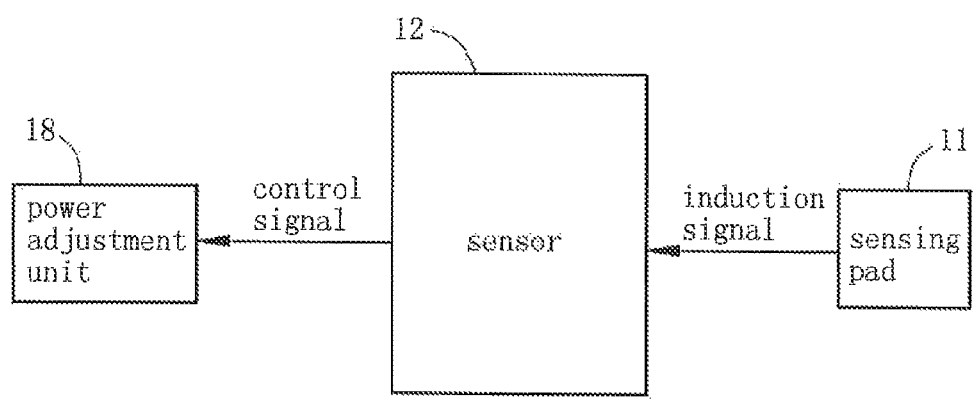
FIG. 4 is a schematic diagram showing a system of a mobile communication device with a human body recognition function in another embodiment of the invention.
Figure 5:
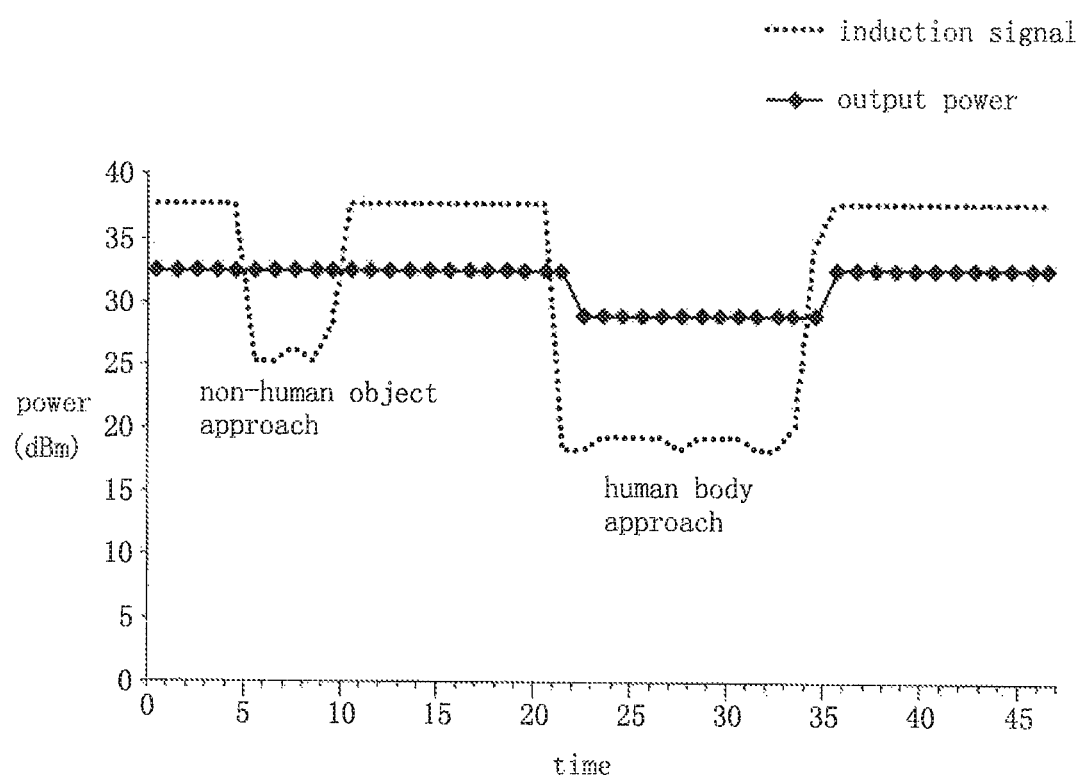
FIG. 5 is a schematic diagram showing a relationship between an induction signal and an output power of a mobile communication device in an embodiment of the invention.

Please refer to FIG. 4 and FIG. 5, FIG. 4 is a schematic diagram showing a system of a mobile communication device with a human body recognition function in another embodiment. FIG. 5 is a schematic diagram showing a relationship between an induction signal and an output power of a mobile communication device.

The difference between this embodiment and the above embodiment is that the mobile communication device 1 further includes a power adjustment unit 18, and the power adjustment unit 18 is electrically connected to the sensor 12. The power adjustment unit 18 is used to adjust the output power of the mobile communication device 1. Please refer to FIG. 5, when the sensor 12 enters into the human body detection mode 16 and determines the target object 2 is a human body (it represents that the first signal is greater than the default value), the sensor 12 transmits a control signal to the power adjustment unit 18 to reduce the output power. Please refer to FIG. 5, when the sensor 12 enters into the human body detection mode 16 and determines that the target object 2 is a non-human object (it represents that the first signal is less than the default value), the sensor 12 does not transmit the control signal to the power adjustment unit 18, thus, the output power of the power adjustment unit 18 still keeps in a fixed value (which is not reduced).

When the target object 2 (a human body) moves far away from the mobile communication device 1 (the target object 2 moves out of the detecting range of the sensing pad 11, in other words, no induction signal is transmitted to the sensor 12), the sensor is set at the first sensitivity (the higher sensitivity) again to make the sensing pad 11 have a good communication quality and induction capability, and then another control signal generated by the sensor 12 is transmitted to the power adjustment unit 18 to improve the output power of the power adjustment unit 18 to return to a normal mode. In a word, when the target object 2 is out of the detecting range, the sensor 12 restores to an original sensitivity and the power adjustment unit 18 of the mobile communication device 1 also restores to an original output power.

As described above, a mobile communication device with a human body recognition function is disclosed in the embodiments, a sensing pad transmits an induction signal to a sensor, and a sensitivity of the sensor is adjusted from a first (high) sensitivity to a second (low) sensitivity after the sensor receives the induction signal. Then, the induction signal is converted into a first signal and compared with a default value which stored inside the sensor to determine whether an approaching target object is a human body. Through the determination in two steps, it can avoid that the mobile communication device generates a misjudgment and reduces an output power of the power adjustment unit to make a wrong action of reducing communication quality when a non-human approaches.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A mobile communication device with a human body recognition function, comprising:
    a sensing pad generating an induction signal when a target object approaches the sensing pad; and
    a sensor electrically connected to the sensing pad and used for receiving the induction signal, wherein the sensor includes a first sensitivity and a second sensitivity, and the first sensitivity is higher than the second sensitivity;
    wherein when the sensor receives the induction signal, the sensor switches the first sensitivity to the second sensitivity, the induction signal is converted into a first signal, and the first signal is compared with a default value, when the first signal is greater than the default value, the target object is determined as a human body.

2. The mobile communication device with the human body recognition function according to claim 1, further comprising:
    a power adjustment unit electrically connected to the sensor, wherein when the target object is determined as the human body, the sensor transmits a control signal to the power adjustment unit to reduce an output power of the power adjustment unit.

3. The mobile communication device with the human body recognition function according to claim 1, further comprising:
    a power adjustment unit electrically connected to the sensor;

wherein when the first signal is less than the default value, the target object is determined as a non-human object, and the output power of the power adjustment unit is not adjusted.

4. The mobile communication device with the human body recognition function according to claim 1, wherein the sensor includes a non-human object detection mode and a human body detection mode.

5. The mobile communication device with the human body recognition function according to claim 4, wherein when the sensor is set at the first sensitivity, the sensor enters into the non-human object detection mode.

6. The mobile communication device with the human body recognition function according to claim 4, wherein when the sensor is set at the second sensitivity, the sensor enters into the human body detection mode.

7. The mobile communication device with the human body recognition function according to claim 5, wherein the induction signal represents a capacitance difference value generated between the target object and the sensing pad when the target object approaches the sensing pad.

8. The mobile communication device with the human body recognition function according to claim 1, wherein the mobile communication device is a smart phone, a desktop computer, a tablet computer or a notebook.

\* \* \* \* \*